March 22, 1960     W. PALMER     2,929,958
SWEEP CIRCUIT

Filed March 12, 1957     2 Sheets-Sheet 1

INVENTOR
WINSLOW PALMER
BY
ATTORNEY

INVENTOR
WINSLOW PALMER
BY
ATTORNEY

2,929,958
SWEEP CIRCUIT

Winslow Palmer, Amityville, N.Y., assignor to Sperry Rand Corporation, a corporation of Delaware Application March 12, 1957, Serial No. 645,558

3 Claims. (Cl. 315—27)

The invention relates to sweep waveform generators, and more particularly, to a simplified waveform generator yielding a wave suitable for A.C. amplification for producing a positionable trace on the face of a cathode ray tube indicator.

In the prior art, two basically different approaches are known for purposes of producing a sweep or a time base for a cathode ray tube indicator and for centering the display pattern thereon. One approach is to generate a sweep waveform and to reference said waveform by means of D.C. restoration to a D.C. potential, the potential being variable in amplitude for purposes of centering the display on the face of the oscilloscope. When the D.C. referencing technique is employed, a relatively high amplitude D.C. potential may be placed directly on the plates of an electrostatically deflected indicator, for example, or the D.C. potential may be superimposed on the sweep waveform at a lower D.C. level with the resultant waveform then being passed through a D.C. amplifier prior to application to the deflection plates. In either case, adjustment of the D.C. potential will produce centering of the display on the indicator in a well known manner.

The D.C. referencing technique, however, carries with it the difficulties of maintaining the amplitude of the D.C. voltage constant, the tendency of D.C. amplifiers to drift being well known.

The second approach to the problem of centering a display on an indicator is to employ an area-balancing method. In the area-balancing method, the deflection waveform is passed through an A.C. amplifier, eliminating the aforementioned problem of D.C. drift. A description of the area-balancing method is given in "Waveforms" by B. Chance et al., published by McGraw-Hill Book Company, 1949, on pages 321–324.

In an example contained in the cited reference, a triangular sawtooth is produced for purposes of beam deflection. The area contained within the sawtooth is then measured and a control signal proportional to said area is produced. The control signal, in turn, is applied to a square wave generator whereby the area of a predetermined portion of the square wave is made equal to the measured area of the sawtooth. The sawtooth and the square wave are then differentially combined in a summation network to produce a bipolar resultant waveform wherein the summation of the positive areas thereof is equal to the sum of the negative areas thereof. Thus, the resultant waveform is area balanced. The resultant waveform is then passed through an A.C. coupling network or amplifier and applied to the deflection coils of an oscilloscope. On passing through the A.C. coupling network, the area symmetry of the resultant waveform about its average value is undisturbed, said average value being equal to zero. If provision is made for normally biasing the cathode ray tube off and for producing an unblanking signal time-coincident with the occurrence of the sawtooth portion of the resultant wave, only the deflection due to said sawtooth portion will be displayed. Inasmuch as the location of the visible display on the face of the oscilloscope relative to the undeflected position of the beam is proportional to the amplitude of the sawtooth relative to the average value of the resultant waveform, the position of the display on the face of the indicator may be displaced as a function of the relative areas of the sawtooth and square wave components of the resultant wave. Thus, by adjusting the area of the square wave component, for example, of the resultant wave, the position of the visible portion of the display (corresponding to the sawtooth portion of the sweep) may be controllably displaced on the face of the indicator.

It is a general object of the present invention to provide for a simplified sweep waveform generator providing for display centering by means of the area-balancing method.

Another object is to provide a sweep generator producing a waveform suitable for A.C. amplification and yet providing for adjustable positioning of the display on the face of the oscilloscope.

A further object is the provision of a synchroscope sweep generator producing a deflection waveform and an unblanking pedestal, said deflection waveform having adjustable symmetry about a predetermined value.

Yet another object is to provide a sweep generator producing a linear sweep of a predetermined length having adjustable symmetry about a predetermined value.

An additional object is to provide a sweep waveform generator for producing a sweep on the face of the oscilloscope, the sweep remaining centered irrespective of changes in sweep speed, sweep length, and duty cycle.

These and other objects of the present invention, as will appear from the following description, are achieved in a preferred embodiment by the provision of a multivibrator circuit of the monostable type adapted to receive a synchronizing trigger. A sawtooth wave is produced on the grid of the normally conducting tube of said multivibrator while a square wave is produced at the plate thereof in a well-known fashion.

In one embodiment of the present invention, adjustable summing means are connected between said grid and plate whereby adjustable amplitudes of the grid and plate waveforms may be additively combined. The combined waveform is then A.C. coupled to a push-pull A.C. deflection amplifier, the output of which is applied, for example, to the deflection means of an oscilloscope. Centering of the display on the face of the oscilloscope is accomplished by varying the adjustable summation means which changes the relative contribution of each of the sawtooth and square waveforms (grid and plate waveforms) to the resultant wave. Sweep speed (slope of the sawtooth) is adjusted by varying a parameter of the multivibrator as is known in the art, for example, as by varying the capacity of the time constant network. The length of the display on the face of the scope is adjusted by varying the gain of the circuit through which the resultant wave is applied to the deflection means of the oscilloscope.

For a more complete understanding of the present invention, reference should be had to the following description and the appended drawings of which:

Figure 1:
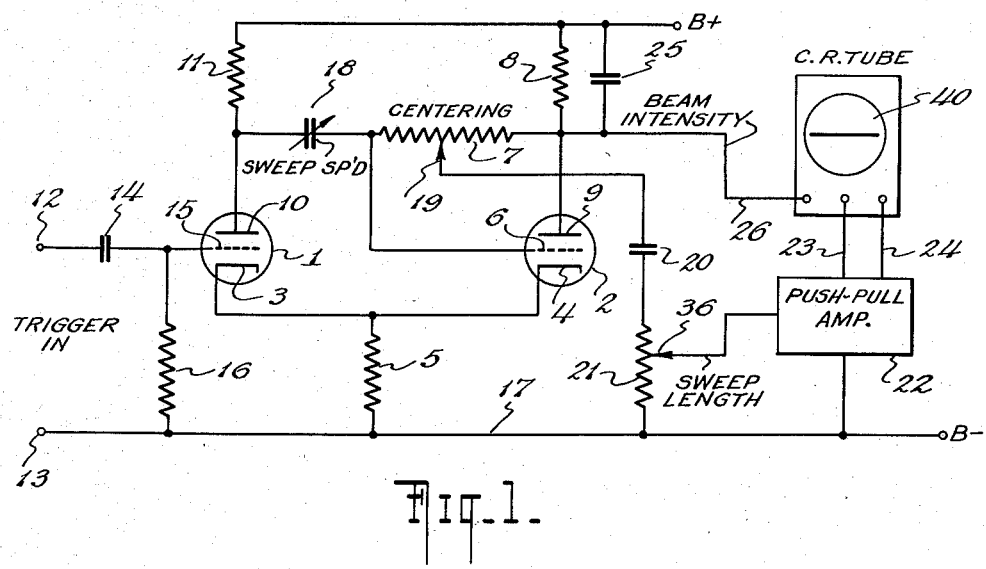
Fig. 1 is a preferred embodiment of the present invention.

In Fig. 1, a conventional cathode-coupled monostable multivibrator is shown being comprised of triodes 1 and 2 whose cathodes 3 and 4 are commonly connected to ground by means of resistor 5. The grid 6 of tube 2 is returned to B+ via potentiometer 7 and resistor 8. Plates 9 and 10 of tubes 2 and 1 are coupled to B+, respectively, by resistors 8 and 11. A trigger pulse is applied across terminals 12 and 13 and is coupled via condenser 14 to the grid 15 of tube 1. Grid 15 is returned to ground via resistor 16. Line 17 is connected to B—.

In the case of the connections shown, tube 2 of the multivibrator will be normally conducting inasmuch as grid 6 thereof is coupled to B+ through potentiometer 7 and resistor 8. The voltage drop across the common cathode resistor 5, caused by the conduction of tube 2, will normally bias tube 1 to cut-off in a well-known manner.

When a positive trigger pulse is applied across terminals 12 and 13, tube 1 will be rendered conductive. The resulting lowered potential of plate 10 thereof is coupled to grid 6 of tube 2 via variable condenser 18. The potential drop coupled through condenser 18 lowers the potential of grid 6 of tube 2. As the potential of grid 6 falls, cathode 4 thereof will drop in potential, further enhancing the conduction of tube 1. This action is regenerative and there is a very quick shift of conduction from tube 2 to tube 1, as is well known in the art.

At the end of the conduction reversal, tube 1 will be conducting and grid 6 of tube 2 will be held below the cut-off by the charge on condenser 18. Plate 9 of tube 2 will then be at substantially the potential of B+. Current now flows through potentiometer 7 charging condenser 18 toward B+ along an exponential curve. The resultant rise in potential of grid 6, as condenser 18 charges, soon reaches the cut-off point of tube 2 whereupon tube 2 again commences to conduct. Current through tube 2 and resistor 5 raises the potential of cathode 3, which reduces the current in tube 1, causing its plate voltage to rise further, raising the potential of grid 6 of tube 2. This action is cumulative causing the state of the circuit to revert back to the stable mode, completing the cycle.

Figure 2:
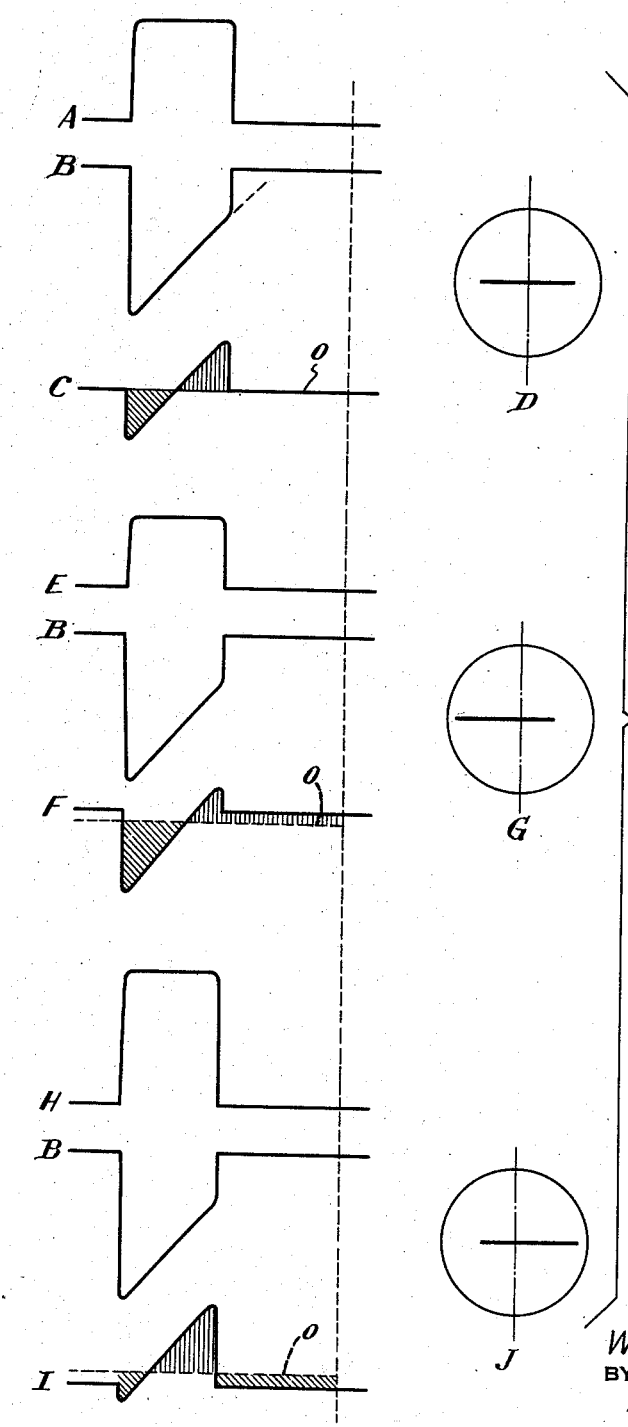
Fig. 2 is a series of waveforms useful in explaining the operation of the present invention.

The waveforms of Fig. 2 illustrate the well-known shapes of the waveforms available at points in the multivibrator circuit. Waveform A represents the voltage appearing on plate 9 of tube 2 while waveform B illustrates the potential appearing on grid 6 of tube 2. It will be noted that the leading and trailing edges of waveforms A and B occur simultaneously in time as they are obtained from the same tube of the multivibrator.

Waveform C shows the resultant waveform obtained by the additive combination of waveforms A and B in such proportion that the maximum negative and positive excursions of waveform C are equally displaced from average value line O above and below which equal positive and negative triangular areas appear. Waveform C, being entirely symmetrical around line O, contains no D.C. component and may be readily passed by an A.C. coupled circuit, such as an A.C. amplifier, to the deflection means of an oscilloscope. In such event the line O of waveform C corresponds to the undeflected position of the electron beam which may be located in the center of the cathode ray indicator. Sweep waveform C produces a trace on the oscilloscope having equal positive and negative excursions from the undeflected position of the beam as shown in Fig. 2D.

According to the present invention, the location of the trace on the face of the oscilloscope may be displaced so that a major portion thereof lies on one side or the other of the undeflected beam position according to whether, for example, more or less of waveform A is additively combined with a fixed amount of waveform B. Should waveforms E and B be additively combined, waveform F will result. Upon the passing of waveform F through an A.C. coupling network, the output waveform will be area-symmetric about the line O. It will be noted, however, that the maximum negative excursion of waveform F is displaced by a greater voltage from line O than is the case with the maximum positive excursion. Thus, when waveform F is A.C. coupled to the deflecting means of the oscilloscope, the trace of Fig. 2G is produced wherein the major portion thereof lies to the left of the deflection center. Conversely, if waveforms H and B are additively combined, the resultant waveform I, when A.C. coupled to the deflected plates of the indicator, will produce a trace of Fig. 2J. The major portion of the trace of Fig. 2J lies to the right of the deflection center of the oscilloscope for the reason that the maximum positive excursions of waveform I lies at a greater voltage displacement wave from line O than does the maximum negative excursion thereof.

Returning to Fig. 1, the plate and grid waveforms of tube 2 may be summed together in various proportions by the position of slider 19. Thus, by the adjustment of slider 19, waveforms similar to C, F, and I may be produced which, when coupled via condenser 20 and potentiometer 21 to push-pull amplifier 22, will produce push-pull deflection signals appearing on lines 23, 24, which will yield traces similar, respectively, to those of Figs. 2D, 2G, and 2J on the face of a cathode ray tube indicator 40.

The purpose of condenser 25, connected from the plate 9 of tube 2 B+, is to slow down the rise time of the square wave appearing on plate 9. Said square wave may be applied via line 26 to the beam intensification grid of the cathode ray tube for unblanking purposes, the cathode ray tube being normally biased off. By delaying the rise time of the unblanking (positive) portion of the square wave appearing on plate 9 of tube 2, the cathode ray tube is not turned on until the linear portion of the resultant sweep has begun.

Figure 3:
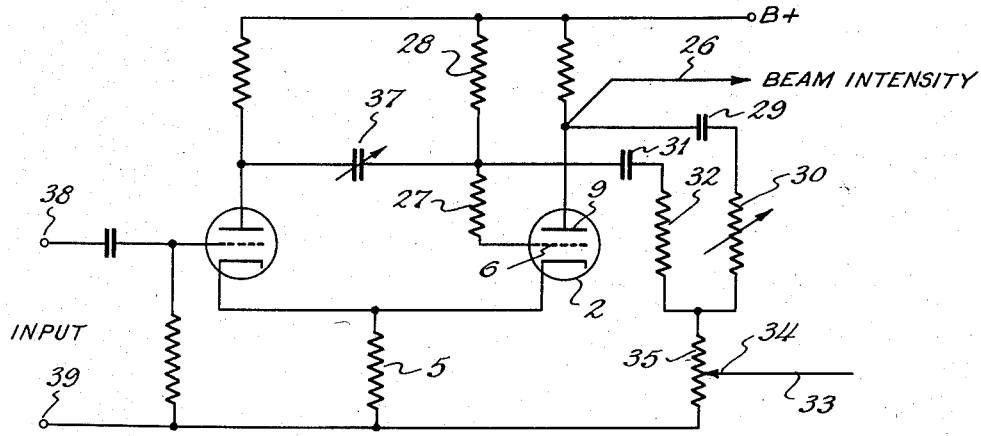
Fig. 3 is an alternative embodiment of the present invention.

Fig. 3 illustrates an alternative embodiment of the present invention wherein means different from that shown in Fig. 1 are employed for additively combining the square wave and sawtooth wave appearing, respectively, on the plate and grid of tube 2.

In Fig. 3, grid 6 of tube 2 is returned to B+ through resistors 27 and 28 rather than by means of a potentiometer interconnecting the grid with the plate as is shown in Fig. 1. The square wave appearing on plate 9 of tube 2 is coupled by condenser 29 to rheostat 30, said rheostat forming a first half of a resistive summing network. The sawtooth wave appearing on grid 6 of tube 2 is coupled via condenser 31 to resistor 32, resistor 32 and rheostat 30 comprising said summing network.

It will be observed that in the embodiment of Fig. 3, the contribution of the sawtooth wave to the resultant wave appearing at output terminal 33 is held constant while the contribution to said resultant wave by the square wave is varied by means of rheostat 30. The amplitude of the resultant wave, appearing at terminal 33, may be adjusted by positioning slider 34 of potentiometer 35. In like manner, the amplitude of the resultant waveform produced by the apparatus of Fig. 1 may be varied by adjustment of the position of slider 36 of potentiometer 21 shown therein. Thus, adjustment of potentiometers 35 or 21 varies the length of the sweeps produced by the respective embodiments of Fig. 3 and Fig. 1.

In the operation of the structures of either Fig. 1 or 3, the position of either slider 19 of potentiometer 7 of Fig. 1 or the position of rheostat 30 of Fig. 3 will be fixed once initial adjustment thereof is made to produce a resultant wave yielding equal deflection of the trace on either side of the undeflected position of the cathode ray tube beam. Thereafter, the average value of the resultant wave will remain substantially fixed irrespective of changes in the duty cycle or repetition rate of the active sweep portion of the resultant wave as by varying condensers 18 or 37 respectively, or by increasing the repetition rate of the trigger pulses applied to terminals 12 and 13 or 38 and 39, respectively, of Figs. 1 and 3.

The maintenance of the average value is attributable to the fact that both the sawtooth and square wave components of the resultant wave are derived from a common source. In the multivibrator source, the duration of the exponential portion of the grid waveform is precisely the same as the duration of the corresponding positive pedestal derived from the plate of the same tube. The amplitudes of both the positive pedestal and the exponential waveforms are fixed once the parameters of the multivibrator circuit have been determined. Therefore, if the duty cycle of the active portion of the resultant wave is varied by adjustment of capacitors 18 of Fig. 1 or capacitor 37 of Fig. 3, the area of both the grid and plate waveform will be varied in equal amounts. Thus, changes in the positive areas of the resultant waveform (contributed by the plate pedestal) will be precisely compensated for by changes in the negative areas of said resultant waveforms, contributed by the grid waveform, so that the average value of the resultant waveform remains fixed irrespective of the adjustment of condenser 18 or 37.

From the above description it can be seen that the objects of the present invention have been achieved by the provision of a multivibrator from which are derived a square wave and a sawtooth wave from the plate and grid, respectively, of same component tube. Said grid and plate waveforms are then combined in an adjustable ratio to vary the maximum positive and negative voltages of the resultant waveform relative to the average value thereof to position the active or visible portion of the display on the face of a cathode ray tube indicator. The resultant waveform may be passed through an A.C. coupling network to the deflection plates of the oscilloscope while still permitting centralization of the display on the face thereof.

The invention provides for the production of an unblanking signal rendering the cathode ray tube operative only during the sawtooth portion of the resultant wave. Provision is also made in the apparatus of the invention for varying the slope of said sawtooth portion and for varying the length of the sweep.

Although a triggered monostable multivibrator has been shown in the preferred embodiments for deriving the component sawtooth and square waveforms, other oscillatory means may be employed such as, for example, a free-running multivibrator.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A deflection circuit for a cathode ray tube having electron beam deflection means comprising a multivibrator including first and second electron tubes, each having at least a grid and plate electrode, adjustable means connected to the grid and plate electrodes of one of said tubes for additively combining the waveforms appearing on said grid and plate electrodes of said one of said tubes to produce a resultant waveform, and means for applying said resultant waveform to said deflection means of said cathode ray tube.

2. A deflection circuit for a cathode ray tube having electron beam deflection means comprising a multivibrator adapted to receive trigger pulses so as to synchronize the frequency of oscillation of said multivibrator with the repetition rate of said pulses, said multivibrator including first and second electron tubes each having at least a grid and a plate electrode, adjustable means connected to the grid and plate electrodes of one of said tubes for additively combining the waveforms appearing on said grid and plate electrodes of said one of said tubes to produce a resultant waveform, and means for applying said resultant waveform to said deflection means of said cathode ray tube.

3. A deflection circuit for a cathode ray tube having electron beam deflection means and electron beam intensification means, said deflection circuit comprising a multivibrator adapted to receive trigger pulses so as to synchronize the frequency of oscillation of said multivibrator with the repetition rate of said pulses, said multivibrator including first and second electron tubes each having at least a grid and a plate electrode, adjustable means connected to the grid and plate electrodes of one of said tubes for additively combining the waveforms appearing on said grid and plate electrodes of said one of said tubes to produce a resultant waveform, means for applying said resultant waveform to said deflection means of said cathode ray tube, and additional means for applying said plate waveform to said beam intensification means of said cathode ray tube.

References Cited in the file of this patent

UNITED STATES PATENTS

| | | |
|---|---|---|
| 2,482,803 | Smith et al. | Sept. 27, 1949 |
| 2,536,822 | Slaymaker et al. | Jan. 2, 1951 |
| 2,540,478 | Frost | Feb. 6, 1951 |
| 2,594,104 | Washburn | Apr. 22, 1952 |
| 2,598,491 | Bergfors | May 27, 1952 |
| 2,708,717 | Holmes et al. | May 17, 1955 |
| 2,794,937 | Williams et al. | June 4, 1957 |